Figure 6:
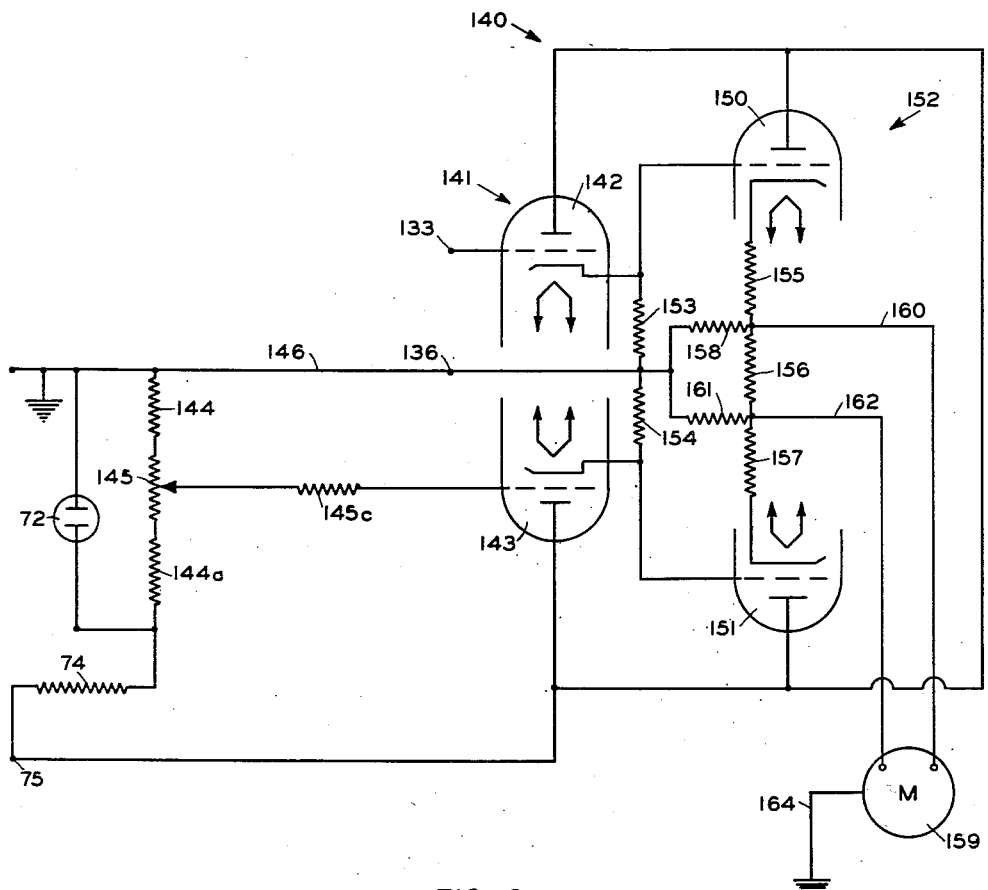

April 16, 1957
D. R. DE BOISBLANC
2,789,269
VACUUM TUBE VOLTMETER
Filed Nov. 26, 1951
3 Sheets-Sheet 1
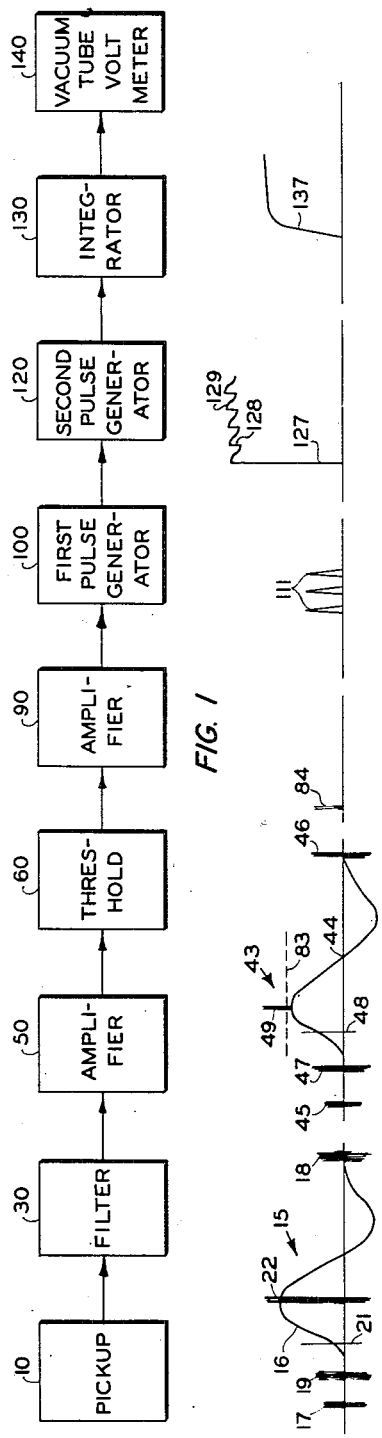
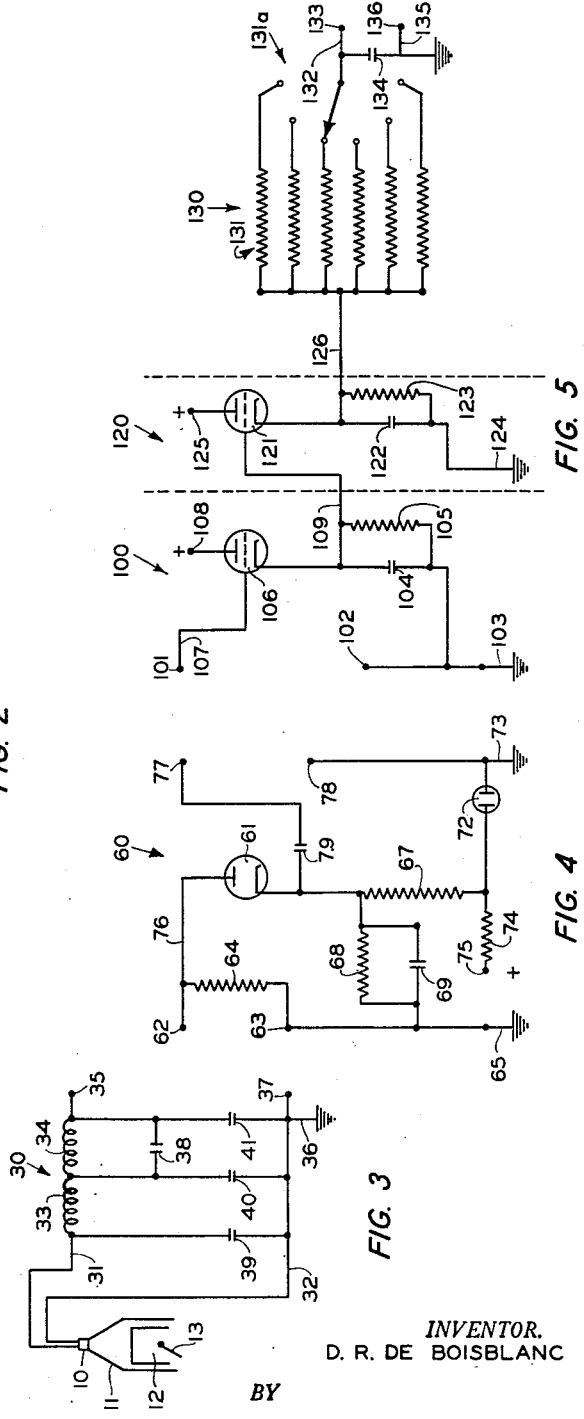
INVENTOR.
D. R. DE BOISBLANC
BY
Hudson & Young
ATTORNEYS April 16, 1957   D. R. DE BOISBLANC   2,789,269
VACUUM TUBE VOLTMETER Filed Nov. 26, 1951   3 Sheets-Sheet 2

INVENTOR.
D. R. DE BOISBLANC
BY
Hudson & Young
ATTORNEYS

April 16, 1957 D. R. DE BOISBLANC 2,789,269
VACUUM TUBE VOLTMETER
Filed Nov. 26, 1951 3 Sheets-Sheet 3

INVENTOR.
D. R. DE BOISBLANC
BY
Hudson & Young
ATTORNEYS

United States Patent Office 2,789,269
Patented Apr. 16, 1957

2,789,269

VACUUM TUBE VOLTMETER

Deslonde R. de Boisblanc, Bartlesville, Okla., assignor to Phillips Petroleum Company, a corporation of Delaware Application November 26, 1951, Serial No. 258,270

2 Claims. (Cl. 324—123)

This invention relates to the combination of a vacuum tube voltmeter with a detonation meter for use with internal combustion engines. In another aspect, it relates to an improved vacuum tube voltmeter for use in measuring detonation.

My improved detonation meter and voltmeter combination includes a pickup for converting pressure variations in a cylinder into electrical currents, a filter for attenuating undesired noise components, such as those due to valve clatter, an amplifier, and a threshold device for rejecting components in the filtered amplified current of less than a predetermined magnitude. The output of the threshold device consists of voltage waves representative of detonations in the engine cylinder. These voltage waves are amplified and fed to a first pulse generating circuit which transforms each wave into a first exponential pulse which decays exponentially from the peak value of the corresponding voltage wave, and thence to a second pulse generating circuit which transforms the successive exponential pulses into second exponential pulses whose rate of decay is relatively small compared to the first pulses. The output of the second generator is then integrated and fed to a vacuum tube voltmeter which indicates the average intensity of knocking over a preselected period. An adjustable integrating circuit of novel design is utilized, and a highly accurate and sensitive vacuum tube voltmeter circuit is provided which has a low voltage on the leads to the indicating meter, thereby reducing shock hazard and the possibility of instrument damage resulting from accidental short circuiting or grounding of the meter leads.

It is an object of the invention to provide a detonation meter including the combination of a novel vacuum tube voltmeter circuit with a pickup device threshold, pulsing and integrating circuits to provide a more accurate indication of detonation intensity than has heretofore been possible.

It is a further object of the invention to provide a balanced vacuum tube voltmeter circuit cooperating with the aforesaid elements which is sufficiently sensitive to respond to variations in detonation intensity caused by a change of a fraction of an octane number in a fuel used in the test engine.

It is a still further object to provide a detonation meter and voltmeter which will duplicate the rating of fuels by the ASTM method more reproducibly and with greater sensitiveness than a bouncing pin, even when operated by an unskilled operator.

It is a still further object of the invention to provide a vacuum tube voltmeter wherein the leads to the meter do not constitute a shock hazard, and which is highly sensitive.

It is a still further object of the invention to provide circuits utilizing standard circuit components which may be easily and economically manufactured.

Figure 7:
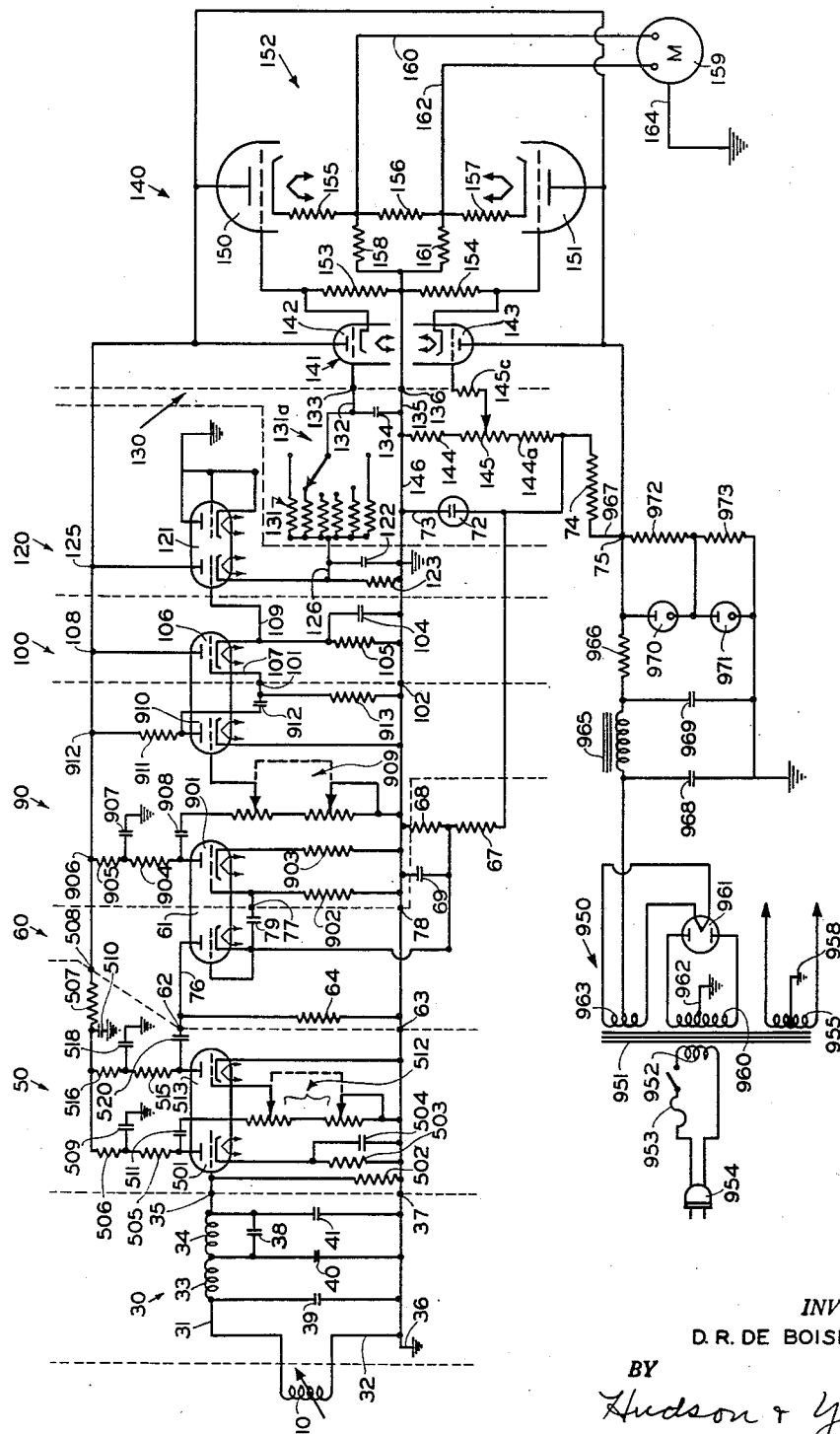

Various other objects, advantages and features of the invention will become apparent from the following detailed description and disclosure taken in conjunction with the accompanying drawings, in which:

Figure 1 is a block diagram of the detonation meter;
Figure 2 is a graph showing the waveform at various stages of the circuit of Figure 1;
Figure 3 is a schematic circuit diagram of the pickup and filter shown by Figure 1;
Figure 4 is a schematic diagram of the threshold device shown by Figure 1;
Figure 5 is a schematic diagram of the pulse generating circuits and integrator shown by Figure 1;
Figure 6 is a schematic diagram of the novel vacuum tube voltmeter circuit; and
Figure 7 is a schematic circuit diagram of the entire detonation meter.

Referring now to the drawings in detail, and particularly to Figures 1 and 2, the novel detonation meter comprises a pickup 10 for converting pressure variations in a cylinder into electric currents. Such pickups are well known in the art and, hence, no detailed description thereof is believed necessary. Preferably, I utilize a magnetostriction type of pickup such as that shown in Eldredge Patent 2,269,760. In Figure 3, the pickup 10 is shown mounted on an engine cylinder 11 having a piston 12 disposed therein which may be reciprocated by a piston rod 13.

In general, the output of the pickup 10 has the waveform shown at 15 in Figure 2. From this figure, it will be noted that the electrical current comprises a main pressure wave 16 representative of the pressure variations caused by normal combustion in the cylinder. The current also includes voltage components 17, 18 representing the opening and closing of the exhaust valves, components 19 representing the operation of the intake valve, and components 21 representing the ignition of the charge in the cylinder 11. The current further includes a voltage wave or component 22 representative of detonation or knocking in the cylinder 11. It will be understood that, when the engine is operating normally without knocking, the fuel in the cylinder is ignited and the ignition zone spreads uniformly through the cylinder, as indicated by the main pressure wave 16. However, when knocking occurs, there is a sudden explosion or detonation in the cylinder and this detonation produces sudden pressure variations of considerable magnitude thereby producing voltage variations in the pickup which are distributed over a wide frequency spectrum.

The output of the pickup 10 is fed to a filter 30 whose frequency range is so selected as to attenuate the undesired voltage components 17, 18, 19 and 21 to a considerable extent while permitting the detonation wave to pass therethrough with little relative attenuation. In Figure 3, this filter is shown connected to conductors 31 and 32 leading from the pickup 10. The filter includes a pair of inductances 33, 34 which are connected in series between conductor 31 and an output terminal 35. The conductor 32 is grounded at 36 and connected to another output terminal 37. The inductor 34 is shunted by a condenser 38 and the respective terminals of inductances 33 and 34 are connected to filter condensers 39, 40 and 41 which, in turn, are connected to grounded conductor 32.

Where it it desired to duplicate the performance in fuel rating of the ASTM bouncing pin, the circuit constants of the inductances and filter condensers are so chosen as to pass a band of frequencies below 4,000 cycles per second and attenuate or substantially eliminate higher frequencies. However, in some cases, a more favorable signal to noise ratio may be obtained by adjusting the filter so as to pass other bands of frequencies. With certain types of engines, it has been found advantageous to utilize a sharply tuned band pass filter resonating at 6,500 cycles per second while, with other engines, it may be advantageous to utilize high pass filters passing frequencies above 8,000 or 12,000 cycles per second. In the present application, it is desired that the performance of the bouncing pin meter be duplicated so that the filter 30 is constructed to pass frequencies below some arbitrary cut off frequency between 2,000 and 4,000 cycles per second.

The filtered electrical current has the waveform shown at 43 in Figure 2. It will be noted that the main voltage wave 44 is substantially unaffected by passage through the filter and has substantially the same shape as main voltage wave 16. However, the voltage components 17, 18, 19 and 21 are attenuated by the filter and appear, respectively, at 45, 46, 47 and 48 in the filtered wave. The detonation wave 22 appears at 49 as a peak or "pip" extending above main pressure wave 44. This results from the fact that the high frequency part of the detonation spectrum has been eliminated by the filter, the resulting voltage wave being free from sinusoidal components and being additive with respect to main voltage wave 44.

If a high pass filter were utilized, the main voltage wave 44 would not appear in the filter output and the detonation wave 49 would include damped sinusoidal components of the frequencies passed by the filter.

The current from filter 30 is fed to an amplifier 50 which increases the amplitude of the various voltage components shown at 43 in Figure 2 but does not change their waveform appreciably. From the amplifier 50, the filtered amplified current is fed to a threshold device 60 which eliminates all voltage components of less than a predetermined amplitude. As shown by Figure 4, the threshold device includes a biased electron tube 61 to which current is fed from input terminals 62, 63 of the threshold device, these input terminals being connected to the output circuit of the amplifier 50. The input terminals are shunted by a resistor 64 and input terminal 63 is grounded at 65. A bias voltage is impressed upon the cathode of electron tube 61 by a network including a resistor 67 which is connected to the cathode of tube 61 and to a resistor 68, the latter part being shunted by large by-pass condenser 69. The network further includes a voltage regulator tube 72 having one terminal connected to the resistor 67, the other terminal of tube 72 being grounded at 73. The resistor 67 is also connected through a resistor 74 to a positive power supply terminal 75. In this manner, a very steady bias is applied to the cathode of tube 61. The plate or the anode of tube 61 is connected by a lead 76 to input terminal 62 thereby completing the input circuit of the threshold device. The output of the threshold device appears across terminals 77 and 78, terminal 77 being connected through a coupling condenser 79 to the cathode of the tube and output terminal 78 being connected to ground at 73.

When the filtered amplified current from the amplifier stage 50 is impressed upon input terminals 62 and 63, voltage components having a sufficient magnitude to overcome the bias impressed upon tube 61 pass therethrough and appear across the output terminals 77 and 78. However, voltage components which are not of sufficient magnitude to overcome the bias impressed on tube 61 do not pass therethrough and do not appear in the output of tube 61. It will also be noted that the voltage components passed by the threshold stage are unidirectional, for the tube 61 functions as a rectifier in addition to its function as a threshold device. The bias on the electron tube 61 is so regulated by choice of the values of the bias network components that only the peak detonation components pass through the threshold device while the main pressure wave and undesired components 45, 46, 47 and 48 are rejected. Thus, as diagrammatically shown by Figure 2, the threshold passes only waves having an amplitude greater than that indicated by the dotted line 83 so that only the portion of detonation wave 49 above this line is passed through the threshold stage. The resulting voltage wave is shown at 84 and consists of the portion of the detonation peak or "pip" which extends above the line 83. This peak has a very narrow width at its base of the order of .001 second.

The electron tube 61 in Figure 4 has been shown as a diode but it will be understood that other tubes may be utilized. If for example, a triode is used, the incoming signal is impressed upon the control grid and the bias is regulated in such fashion that only components of the desired magnitude are passed through the tube. In this case, the threshold stage may have an amplifying function in addition to its threshold and rectification functions. It is also within the scope of the invention to use pentodes or other multiple electron tubes in a manner which will be familiar to those skilled in the art.

The output of the threshold device is fed to an amplifier 90 from terminals 77 and 78, thereby increasing the amplitude of voltage wave 84 without changing its waveform appreciably. The output of the amplifier is fed to a first pulse generating circuit 100. This circuit has input terminals 101 and 102, the latter terminal being grounded at 103. The pulse generating unit comprises an energy storage device and means for slowly discharging said energy storage device. In the present circuit, the energy storage device is a condenser 104 and the discharging means is a resistor 105 shunted across said condenser. However, the energy storage device may be any other suitable energy storage component, as those skilled in the art will understand. One terminal of the resistance-capacitance unit 104, 105 is connected to grounded input terminal 102 while the other terminal of the unit is connected to the cathode of a triode 106, the control grid of which is connected by a lead 107 to input terminal 101. The triode 106, which may be one section of a 6SL7 dual triode, is connected in a cathode follower circuit and, accordingly, its anode is connected directly to a positive power supply terminal 108 while the output is taken from the cathode by a conductor 109, it being understood that the output of the pulse generating circuit appears between conductor 109 and ground.

When an amplified detonation peak 84 is impressed upon the terminals 101 and 102, current passes through the triode 106 thereby charging condenser 104. This condenser then discharges slowly through resistor 105 producing an exponential pulse, such as indicated at 111 in Figure 2. The value of condenser 104 is made sufficiently small that it can be charged by tube 106 in an interval of time which is small as compared with the length of voltage waves 84 so that the pulses 111 have a very steep wave front. The voltage of each pulse 111 decays much more slowly than the voltage of the corresponding wave 84. Accordingly, the voltage wave 84 is transformed into a continuous pulse of exponentially decaying waveform. The time constant of the resistance-capacitance unit 104, 105 is so chosen that the pulses 111 resulting from successive detonation peaks 84 are spaced and do not overlap. Suitable values for obtaining this result are a value of .01 mfd. for the condenser 104 and 1 megohm for the resistor 105. The amplitude of each individual pulse is determined by the amplitude of the corresponding peak 84 since the amplitude of this peak determines the initial charge impressed upon the condenser. The cathode follower type of coupling has been found extremely advantageous in this circuit since it acts as a low impedance source to charge the condenser 104 when a pulse 84 is present on the grid of tube 106, and an almost infinite impedance when no pulse is impressed on the grid and while condenser 104 is discharging.

The output of the first pulser 100 is fed to a second pulse generating circuit 120. In Figure 5, this connection is represented by the connection of conductor 109 to the control grid of a triode 121. This pulsing circuit includes an energy storage device, such as a condenser 122, and means for discharging said energy storage device, such as a resistor 123 shunted across the condenser. The resistance-capacitance unit 122, 123 is connected between the cathode of triode 121 and a ground connection 124. The triode 121 is also connected in a cathode follower circuit and, accordingly, has its anode directly connected to a positive terminal 125 of the power supply, the output from the second pulse generating circuit appearing between ground and a conductor 126 attached to the cathode of triode 121.

The resistance-capacitance unit 122, 123 has a substantially higher time constant than the unit 104, 105 of the first pulse generating stage 100. Thus, suitable values for these components are a value of 1 mfd. for condenser 122 and a value of 1 megohm for resistor 123. Consequently, in the circuit shown, the time constant of the unit 122, 123 is approximately 100 times as great as the time constant of the unit 104, and 105. As a result, each time a pulse 111 is impressed upon the grid of triode 121, a sustained pulse of much longer duration is produced by the pulse generating circuit 120. When a series of pulses 111 is fed to the circuit 120 responsive to successive detonations in the cylinder, the pulses produced by circuit 120 are of sufficiently long duration as to overlap thereby producing a voltage wave 127 having a crest 128 of generally saw-toothed configuration. The peak magnitude 129 of each tooth is proportional to the magnitude of the corresponding pulse 111 by which it is produced and the amplitudes of the pulses 111, in turn, are proportional to the peak intensities of the respective detonations in the cylinder. Accordingly, each detonation produces a tooth 129 on the wave crest 128 which is proportional in amplitude to the peak intensity of the detonation. Of course, if there is no detonation over a period of several cycles, the exponentially declining value of the crest 128 may reach the zero axis of the curve. The purpose of generating pulses 111 is to sustain the peak values of waves 84 long enough for tube 121 to charge the relatively large condenser 122 to a value substantially proportional to the peak value of pulses 111 and waves 84.

In connection with the graphs of Figure 2, it is to be understood that the time axis is not uniform for the respective voltage waves shown by the figure due to the unduly large space which would be required to depict these graphs in their proper scale. Rather, these figures are merely intended to provide an indication of the waveform at the various stages of the detonation meter.

The output of the second pulse generator 120 is fed to an integrating circuit 130 which comprises a multiple resistance unit 131 having one terminal thereof connected to conductor 126 and having its other terminal connected through a selector switch 131a to a wire 132 leading to an output terminal 133, an integrating condenser 134 being connected between wire 132 and a grounded conductor 135 which is connected to the other output terminal 136. The condenser 134 may have a value of 1 mfd. and the resistance unit 131 may have a value of 1.2 to 30 megohms, depending on the setting of switch 131a. This circuit integrates the wave 127 produced by the second pulse generating circuit 120 and forms a substantially smooth voltage wave 137 representing the average value of the pulses 129 as well as the average value of peak detonation intensity over a plurality of engine cycles, the time constant of the integrating circuit being variable by adjustment of switch 131a. This integrated voltage is fed from the terminals 133, 136 to a vacuum tube voltmeter 140 of novel construction which provides an accurate measure of the average detonation intensity.

The detonation meter constructed in accordance with the foregoing principles is very accurate and gives extremely reliable readings which may readily be taken by an unskilled observer. The meter has been found to be sufficiently sensitive to detect variations in knocking intensity caused by a variation of a fraction of an octane number in the rating of the fuel supplied to the engine cylinder.

The sensitiveness and accurateness of the meter result, to a large extent, from the novel cathode follower pulsing circuits in combination with the integrator and the novel balancing circuits provided in the vacuum tube voltmeter which will now be described.

Referring to Figure 6, the novel balanced voltmeter circuit includes a dual triode 141 consisting of two triode sections 142 and 143. The integrated voltage appearing across the terminals 133 and 136 is fed to the grid of triode 142. The grid circuit of triode 143 includes a set of serially connected resistances 144, 144a, together with a potentiometer 145, this unit being shunted by the voltage regulator tube 72. One terminal of this unit is connected to the positive power supply terminal 75 through resistor 74, and its other terminal is connected to a ground conductor 146, the contactor of potentiometer 145 being connected through a voltage dropping resistor 145c to the control grid of triode 143. The values of the potentiometer and resistors are so chosen as to balance the load impressed upon the control grid or triode 142 by the integrating circuit 130, the potentiometer 145 permitting an accurate adjustment to be made. The dual triode 141 also utilizes the cathode follower principle and, hence, the anodes of the respective triode sections are directly connected to positive terminal 75 of the power supply unit. The respective cathodes of dual triode 141 are connected to the control grids of the triode sections 150, 151 of a dual triode 152. The grid circuit of triodes 150, 151 also includes grounded grid resistances 153 and 154, the anodes of these tubes being connected directly to positive power supply terminal 75. In accordance with the invention, the cathodes of tubes 150, 151 are interconnected by a resistance network which includes three serially connected fixed resistances 155, 156 and 157. The junction between resistors 155, 156 is connected to ground through a fixed resistor 158, and to one terminal of a meter 159 by a lead 160. The junction between resistors 156, 157 is connected to ground through a fixed resistor 161 and to the other meter terminal by a lead 162. The casing of the meter is grounded, as indicated at 164.

The resistance of unit 156 is quite low compared to that of the other resistors in the network. For example, resistor 156 may have a value of ten ohms, resistors 155, 157 may have a resistance of two megohms, and units 158, 161 may have a resistance of three megohms. As a result, leads 160, 162 are maintained substantially at ground potential with the result that shock hazards are eliminated, as is the possibility of instrument damage due to short circuiting or grounding of the meter leads 160, 162. If these leads were connected, for example, in the anode circuit, the resistors in the plate circuit might be burned out if the meter leads were grounded, and other damage might be caused to the instrument. Moreover, the low potential is maintained at leads 160, 162 without impairing the sensitivity of the instrument, due to the balancing network 155, 157, 158 and 161. The accurate and sensitive meter reading which I obtain also results from the use of balanced dual triode circuits and the cathode follower coupling between the two stages of the vacuum tube voltmeter.

In Figure 7, the circuits already described in connection with Figure 1 are indicated by like reference characters and, hence, need not be further described herein. The amplifier 50 is of conventional construction and may include a triode 501 having its control grid connected to input terminal 35 and to a grounded load resistor 502. The cathode of triode 501 is connected to ground through a cathode-biasing resistor 503 which is shunted by a condenser 504. The anode of triode 501 extends through resistors 505, 506 and 507 to a positive terminal 508 of the power supply and these resistors cooperate with the respective grounded filter condensers 509 and 510. The anode of tube 501 is coupled through a condenser 511 to a grounded attenuator 512 having its adjustable tap connected to the control grid of a triode 513. The cathode of triode 513 is connected directly to ground while the anode is connected through resistors 515, 516 and 507 to terminal 508, a grounded filter condenser 518 being connected between resistors 515 and 516. The anode of triode 513 is also connected through a coupling condenser 520 to output terminal 62 and output terminal 63 is grounded. For convenience, the two triodes 501 and 513 may be included in a single envelope, as shown.

The amplifier 90 is likewise of conventional construction and may include a triode 901 having its control grid connected to input terminal 77 and to a grounded load resistor 902. The cathode of triode 901 is connected to ground through a bias resistor 903 while its anode is connected through resistors 904 and 905 to a positive terminal supply 906, a grounded filter condenser 907 being connected between resistors 904 and 905. The anode is also connected through a coupling condenser 908 to a grounded attenuator 909, the top of which is attached to the control grid of a triode 910. The cathode of triode 910 is connected directly to ground while the anode is connected through a resistor 911 to a positive power supply terminal 912. The anode of triode 910 is also connected to output terminal 101 through a coupling condenser 912 and the other output terminal 102 is grounded, these terminals being shunted by a load resistor 913. If desired, a cathode ray tube may be connected at 101 and 102 for reading the voltage waves as they are produced by the threshold amplifier. For convenience, triodes 106 and 910 are enclosed in a single envelope as are triodes 61 and 901. In order to secure uniformity triode 121 may also be part of a dual triode, the other section having its electrodes connected together and grounded.

A power supply unit 950 is also shown in Figure 7 and is of conventional construction. This unit may include a power transformer 951 having a primary winding 952 connected to a fuse 953 and a plug 954 for a 110 volt line. The transformer 951 has a center tapped winding 955 for supplying current to the heaters of the electron tubes previously described and the center tap is grounded at 958. Transformer 951 also includes a center tapped secondary winding 960 which is connected to the anodes of a dual rectifier tube 961, the center tap being grounded at 962. The transformer also includes a center tapped winding 963 for supplying filament current to rectifier 961 and this center tap is connected through a choke 965 and a resistor 966 to a positive bus bar 967. A filtering unit may be provided comprising condensers 968 and 969, regulator tubes 970, 971 and bleeder resistors 972 and 973. Current from the bus bar 967 is supplied to the positive power supply terminals 75, 148, 161, 149, 125, 108, 508, 906, and 912.

The operation of the complete detonation meter will now be apparent to those skilled in the art. When the engine is operated, the pickup 10 generates voltages substantially proportional to the intensity of detonations in the cylinder together with voltages responsive to the main pressure wave and unwanted voltage components representing valve clatter and other disturbances in the cylinder. These voltages then pass through the filter in which the constants of the capacitors and inductances are so chosen as to attenuate the unwanted components without causing a serious decrease in the strength of the detonation voltage wave. The filtered voltage is then amplified and fed to the threshold 60 where all voltages below a predetermined amplitude are eliminated. The output of the threshold is a series of voltage waves each having an amplitude proportional to the peak intensity of the detonation corresponding thereto.

The amplitude of these voltage waves is then increased by amplifier 90 and the amplified waves are fed to the pulsing circuit 100 wherein they are transformed into spaced exponential pulses having amplitudes proportional to the respective peak detonation intensities. These exponential pulses are fed to the second pulse generator 120 in which the spaced pulses are converted into overlapping pulses of longer duration, due to the substantially higher time constant of the resistance-capacitance unit in pulsing circuit 120. The resulting wave has a crest of generally saw-toothed configuration, the peak of each tooth having an amplitude proportional to the peak intensity of the corresponding detonation. The output of the second pulse generator then goes to the integrator 130 where a smooth steady voltage is produced which is proportional to the average peak detonation intensity indicated by a series or plurality of voltage waves produced by successive detonations in the cylinder. This integrated voltage is read upon vacuum tube voltmeter 140 in which accurate readings are obtained due to the novel balanced circuit utilized.

An electronic instrument has been disclosed above which does not require an expert operator, as is necessary with the ASTM bouncing pin. No intricate mechanical adjustments are necessary in the present invention. More accurate and more sensitive results are obtained and yet these results have the same standard of rating as the bouncing pin so that results may be compared directly with those made by the ASTM bouncing pin. In addition, the novel voltmeter and pulsing circuits contribute increased accuracy which provides a more dependable reading than has heretofore been obtainable. Also, the flexibility of the circuit is substantially increased due to the multiple time constants assignable to the integrating circuit 130 by adjustment of multi-position switch 131a.

While the invention has been described in connection with a present, preferred embodiment thereof, it is to be understood that this description is illustrative only and is not intended to limit the invention.

I claim:

1. A vacuum tube voltmeter which comprises, in combination, a source of input voltage to be measured, two vacuum tubes each having an anode, a cathode, and a control grid, means for supplying operating potentials to the electrodes of said tubes, means for connecting one control grid to said source of voltage, a voltage divider network including a current source, a potentiometer and a fixed resistance connected in series across said current source, a voltage regulator tube connected in parallel with said potentiometer, and a lead connecting the contactor of said potentiometer with the control grid of said other vacuum tube, a pair of electron tubes, each having an anode, a cathode, and a control grid, means for supplying operating potentials to the electrodes of said electron tubes, leads connecting the cathodes of said vacuum tubes directly to the control grids of the respective electron tubes, a resistance network including three resistors connected in series between the cathodes of said electron tubes, the middle resistor having an ohmic value substantially lower than that of the other resistors, a two terminal meter having its terminals in shunt with said middle resistor, and a pair of volage dropping resistors connected between ground and the respective terminals of said middle resistor, said voltage dropping resistors having an ohmic value substantially higher than that of said middle resistor.

2. The vacuum tube voltmeter of claim 1 wherein said meter has a casing which is connected to ground.

References Cited in the file of this patent

UNITED STATES PATENTS

| | | |
|---|---|---|
| 2,316,044 | Blair | Apr. 6, 1943 |
| 2,432,826 | Smith | Dec. 16, 1947 |
| 2,448,323 | De Boisblanc | Aug. 31, 1948 |
| 2,475,377 | De Bruin | July 5, 1949 |
| 2,511,562 | Bresee | June 13, 1950 |
| 2,513,281 | Buras et al. | July 4, 1950 |

(Other references on following page)

UNITED STATES PATENTS

| | | |
|---|---|---|
| 2,516,520 | Lamport et al. | July 25, 1950 |
| 2,589,721 | McNaney | Mar. 18, 1952 |
| 2,613,235 | Grunsky | Oct. 7, 1952 |
| 2,615,063 | Brown | Oct. 21, 1952 |
| 2,633,738 | De Boisblanc | Apr. 7, 1953 |
| 2,647,174 | Maron | July 28, 1953 |

OTHER REFERENCES

Bovey: Abstract of application Ser. No. 118,347, published February 17, 1953, O. G., vol. 667, pp. 764–765.